United States Patent Office 3,524,863
Patented Aug. 18, 1970

3,524,863
9 - OXO - 2 - CYANO - 2,3[1H] - XANTHENEDICAR-
BOXIMIDE COMPOUNDS AND PROCESS OF
PREPARATION
Kenneth Robert Huffman and Edwin Fisher Ullman,
Stamford, Conn., assignors to American Cyanamid
Company, Stamford, Conn., a corporation of Maine
No Drawing. Filed Oct. 24, 1966, Ser. No. 588,763
Int. Cl. C07d 27/52
U.S. Cl. 260—326                    10 Claims

ABSTRACT OF THE DISCLOSURE

New photochromic 9-oxo-2-cyano-2,3[1H]-xanthene-dicarboximide compounds and a process for their preparation.

---

This invention relates to photochromic 9-oxo-2-cyano-2,3[1H]-xanthenedicarboximide compounds of the formula

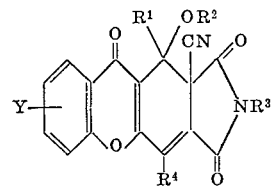

(I)

wherein $R^1$ is phenyl or substituted phenyl, $R^2$ is hydrogen or acyl, $R^3$ is hydrogen, alkyl, or phenyl, $R^4$ is alkyl, phenyl, or substituted phenyl, and Y is hydrogen, alkyl, phenyl, alkyl-substituted phenyl, hydroxy, alkoxy, alkylthio, acyloxy, cyano, nitro, amino, halogen, or trifluoromethyl; the substituents for phenyl in $R^1$ and $R^4$ being alkyl, hydroxy, alkoxy, alkylthio, cyano, nitro, amino, halogen, or trifluoromethyl.

Alkyl in alkyl, alkoxy, alkylthio and alkyl-substituted phenyl of Formula I above may contain from one to about eighteen carbon atoms inclusive, but preferably is lower alkyl ($C_1$–$C_8$). Acyl includes

and acyloxy includes

wherein $R^5$ is aliphatic (e.g., $C_1$–$C_8$), aromatic (e.g., phenyl or naphthyl) or hydrogen. Amino includes

—$NH_2$ monoalkylamino or dialkylamino wherein alkyl is preferably lower alkyl ($C_1$–$C_8$). Halogen includes chloro, bromo, iodo and fluoro. From the definition of Y, R and $R^1$ it will be noted that the substituents may each be different or, in some cases, two or all three may be the same. The foregoing description is but typical of the many substituents effective as Y, $R^1$, $R^2$, $R^3$ and $R^4$, it being understood that other substituents and combinations which do not inhibit the photochromic character of the compound will also be suitable.

These compounds are conveniently prepared by condensation of an appropriately substituted 3-benzoyl-2-benzyl (or alkyl) chromone wtih a known 2-halo-3-cyanomaleimide in the presence of a strong base, or subsequent to treatment of the chromone with a strong base, according to Equation A below:

(A)

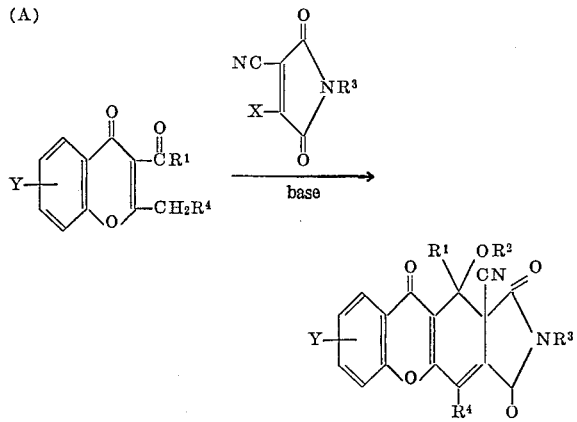

(B)

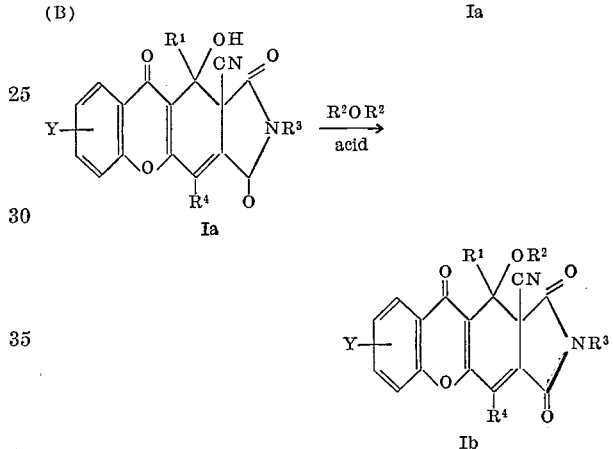

In these equations Y and the R groups are as defined above and X is halo, e.g., chloro, bromo, or iodo. Equation B illustrates formation of the acyl derivative ($R^2$ being

)

from the hydroxy substituted product ($R^2$ being hydrogen).

The 3-benzoyl-2-benzylchromone reactants ($R^4$ is phenyl or substituted phenyl) are known compounds as disclosed, for example, in copending application Ser. No. 418,328 filed Dec. 14, 1964 now Pat. No. 3,331,859, issued July 18, 1967, in the names of Kenneth Robert Huffman and Edwin Fisher Ullman. However, the 3-benzoyl-2-alkyl-chromone reactants are novel compounds and are themselves photochromic. Application Ser. No. 588,745 filed Oct. 24, 1966, now Pat. No. 3,444,212, issued May 13, 1969, discloses the 3-benzoyl-2-alkylchromones with synthesis. Both of said patent applications are incorporated herein by reference.

Alternatively, as shown in Equation C below, the compounds of the invention, wherein $R^3$ on the imide nitrogen atom is alkyl, may be prepared by subsequently reacting the xanthenedicarboximide product with an alkyl halide (R³X) in the presence of a base to provide the requisite R³ group:

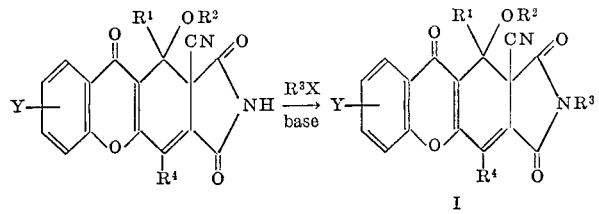

The base in the reactions of Equations A and B is preferably a strong base such as sodium hydride; sodium triphenylmethide; alkali metal alkoxides such as sodium ethoxide and potassium butoxide; alkali metal dialkyl amides such as lithium diethylamide and lithium dipropylamide; and the like. Reaction is effected generally in an inert organic solvent medium such as tetrahydrofuran, dioxane, dimethylsulfoxide, 1,2-dimethoxyethane, t-butyl alcohol, and the like. In the process of Equation A, it is preferred to form the anionic conjugate base of the 3-benzoyl-2-benzyl (or alkyl) chromone reactant by addition of the strong base before reaction with the 2-halo-3-cyanomaleimide but reaction with base may be achieved simultaneously with cyanomalemide reaction.

The reactants of Equation A, including the strong base, are employed in substantially equimolecular amounts although an excess of any reactant may also be used. In Equation B equimolecular amounts, or excesses, are likewise employed but the acid operates primarily as a catalyst and is therefore employed in catalytic amounts, e.g., 0.001% to 5% by weight. Suitable acids include mineral acids such as sulfuric, phosphoric, hydrochloric and organic acids such as paratoluene sulfonic, and the like. R²OR² in Equation B defines an organic acid anhydride,

which preferably is a lower alkyl ($R^5$ being $C_1$–$C_8$) anhydride or aryl anhydride such as acetic anhydride, propionic anhydride or benzoic anhydride.

Other conditions for the reactions illustrated by Equations A, B, and C are non-critical. For example, reaction time may vary from several minutes to several hours or until reaction is complete and temperature may be in the range 0° C. to about 200° C., the preferred temperature being reflux temperature, which is dependent on pressure and choice of reactants and solvent. Likewise, order of addition is not critical, pressures may be atmospheric, subatmospheric or superatmospheric, and the processes may be batch, continuous or semi-continuous.

The compounds of the invention exhibit photochromism, usually be ultraviolet irradiation, and are therefore useful in the manufacture of articles such as sunglasses, novelty toys, jewelry, and variable light transmission devices such as windows, photocopying machines and materials, optical masks, and the like.

Photochromic films, moldings or coatings, containing compounds of the invention in solution or as dispersed solids are particularly useful embodiments. Typical films are prepared by dissolving the compound in a suitable solvent such as benzene and adding this solution to a thermoplastic polymer solution. A representative composition is a 20% by weight solids mixture containing polymethylmethacrylate and photochromic compound (95% polymer to 5% photochromic compound). The composition is then spread on a suitable substrate such as polyester film and the solvent evaporated. The resulting article is useful as an optical mask, memory tape or sunvisor.

The following examples further illustrate embodiments of the invention. All parts and percentages are by weight unless otherwise specified.

EXAMPLE 1

2-cyano-1,2-dihydro-1-hydroxy-9-oxo-1,4-diphenyl-xanthene-2,3-dicarboximide

A stirred solution of the sodium derivative of 3-benzoyl-2-benzylchromone, prepared from 5.1 grams of the chromone and 1.0 gram of sodium hydride (as a 50% dispersion in mineral oil) in 50 milliliters of dry tetrahydrofuran, was treated dropwise with a solution of 2.5 grams of 2-chloro-3- cyanomaleimide in tetrahydrofuran. The resulting greenish-black mixture was stirred at 25° C. for 2.5 hours and evaporated to dryness in vacuo. The blue solid residue was dissolved in ice water and extracted twice with methylene chloride to remove the mineral oil and any unreacted starting materials. The aqueous solution was then acidified with dilute hydrochloric acid and extracted several times with methylene chloride. The dried extracts were evaporated to give a black solid which was washed with benzene and then triturated with boiling methylene chloride to give 2.6 grams of solid, melting point 232–234° C. (decomposition). The methylene chloride filtrate was diluted with petroleum ether and chilled to give another 0.8 gram, melting point 231–233° C. (decomposition). The total yield was 3.4 grams (47%). Two recrystallizations from methylene chloride-petroleum ether gave nearly colorless crystals, melting point 235–236.5° C. (decomposition).

Analysis.—Calc'd for $C_{28}H_{16}N_2O_5 \cdot H_2O$ (percent): C, 70.29; H, 3.79; N, 5.86. Found (percent): C, 70.17; H, 3.48; N, 5.81.

EXAMPLE 2

2-cyano-1,2-dihydro-1-hydroxy-9-oxo-1,4-diphenyl-xanthene-2,3-(N-methyldicarboximide)

A solution of 0.48 gram of the product of Example 1 in 25 milliliters of dry tetrahydrofuran was added dropwise with stirring to a suspension of 0.2 grams of 50% sodium hydride (4.0 equivalents) in 5 milliliters of tetrahydrofuran. The resulting purple mixture was refluxed with stirring for 10 minutes giving an intensely blue solution. A large excess, 2.8 grams, of methyl iodide was added and refluxing was continued for 1.5 hours while the color gradually changed back to purple. The cooled solution was treated with wet tetrahydrofuran to decompose the excess sodium hydride and then evaporated to dryness. The residue was dissolved in water, extracted once with methylene chloride to remove the mineral oil, and then acidified with dilute hydrochloric acid. The dark oil was extracted from the aqueous mixture with several portions of methylene chloride and the dried extracts diluted with petroleum ether and concentrated on a steam bath. Upon standing the solution deposited 0.26 gram (46%) of tan crystals, melting point 177–180° C. (decomposition) .

Analysis.—Calc'd for $C_{29}H_{18}N_2O_5 \cdot CH_2Cl_2$ (percent): C, 64.41; H, 3.60; N, 5.01. Found (percent): C, 64.26; H, 3.50; N, 5.17.

EXAMPLE 3

1-acetoxy-2-cyano-1,2-dihydro-9-oxo-1,4-diphenyl-xanthene-2,3-dicarboximide

A suspension of 0.48 gram of the product of Example 1 and 3 drops of concentrated sulfuric acid in 50 milliliters of acetic anhydride was stirred at 25° C. for 1.5 hours and poured into ice water. The aqueous mixture was then stirred until crystallization of the product was complete. Filtration afforded 0.46 gram (90%) of tan solid, melting point 220–222° C. (decomposition).

Analysis.—Calc'd for $C_{30}H_{18}N_2O_6 \cdot \frac{1}{2} H_2O$ (percent): C, 70.45; H, 3.74; N, 5.48. Found (percent): C, 70.79; H, 3.74; N, 5.61.

EXAMPLES 4–26

Table I below illustrates other compounds of the invention which are prepared substantially as described hereinabove. The generic formula is given for convenience in identifying the substituents.

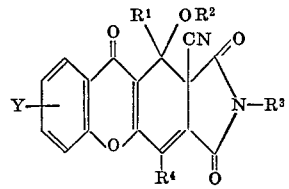

7. A process for preparing a compound (I) of the formula:

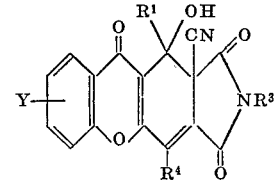

(I)

| Example | R¹ | R² | R³ | R⁴ | Y |
|---|---|---|---|---|---|
| 4 | Phenyl | Hydrogen | Phenyl | Phenyl | Hydrogen. |
| 5 | do | do | Methyl | Methyl | Do. |
| 6 | do | Propionyl | Hydrogen | do | Do. |
| 7 | p-Hydroxy | Hydrogen | do | Phenyl | 6-ethyl. |
| 8 | Phenyl | do | do | Methyl | Hydrogen. |
| 9 | p-Methoxyphenyl | do | do | p-Methoxyphenyl | Do. |
| 10 | p-Hydroxyphenyl | do | do | p-Hydroxyphenyl | Do. |
| 11 | o-Chlorophenyl | do | do | p-Methylthiophenyl | Do. |
| 12 | Phenyl | do | do | p-Tolyl | 6-phenyl. |
| 13 | p-Methylphenyl | do | do | Ethyl | 6-p-tolyl. |
| 14 | m-Nitrophenyl | do | do | p-Diethylaminophenyl | Hydrogen. |
| 15 | p-Dimethylaminophenyl | do | do | m-Nitrophenyl | Do. |
| 16 | Phenyl | Acetyl | do | o-Chlorophenyl | 8-chloro. |
| 17 | p-Cyanophenyl | Hydrogen | do | Phenyl | 7-hydroxy. |
| 18 | Phenyl | do | do | i-Butyl | 5-bromo. |
| 19 | p-Methylthiophenyl | do | Ethyl | Methyl | Hydrogen. |
| 20 | o-Fluorophenyl | Hydrogen | Hydrogen | p-Cyanophenyl | Hydrogen. |
| 21 | Phenyl | do | do | Phenyl | 6-dimethylamino. |
| 22 | do | i-Butyroyl | i-Butyl | do | Do. |
| 23 | m-Trifluoromethylphenyl | Hydrogen | Hydrogen | m-Trifluoromethylphenyl | Hydrogen. |
| 24 | Phenyl | do | do | Ethyl | 7-trifluoromethyl. |
| 25 | do | do | do | n-Undecyl | Hydrogen. |
| 26 | p-Dimethylaminophenyl | do | do | Phenyl | Do. |

We claim:
1. A photochromic compound of the formula:

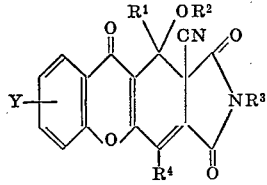

wherein R¹ is phenyl or substituted phenyl, R² is hydrogen or

said R⁵ being hydrogen, alkyl of 1 to 8 carbons, phenyl or naphthyl, R³ is hydrogen, alkyl, or phenyl, R⁴ is alkyl, phenyl, or substituted phenyl, and Y is hydrogen, alkyl, phenyl, alkyl-substituted phenyl, hydroxy, alkoxy, alkylthio,

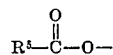

cyano, nitro, amino, alkyl- and dialkylamino, said alkyl having 1 to 8 carbons, halogen, or trifluoromethyl; the substituents for phenyl in R¹ and R⁴ being alkyl, hydroxy, alkoxy, alkylthio, cyano, nitro, amino, halogen, or trifluoromethyl, said alkyl being from 1 to 8 carbon atoms.

2. The compound of claim 1 wherein Y, R² and R³ are hydrogen and R¹ and R⁴ are phenyl.

3. The compound of claim 1 wherein Y and R² are hydrogen, R³ is methyl and R¹ and R⁴ are phenyl.

4. The compound of claim 1 wherein Y and R³ are hydrogen, R² is acetyl, and R¹ and R⁴ are phenyl.

5. The compound of claim 1 wherein Y, R² and R³ are hydrogen, R¹ is p-dimethylaminophenyl, and R⁴ is phenyl.

6. The compound of claim 1 wherein Y, R² and R³ are hydrogen, and R¹ and R⁴ are p-methoxyphenyl.

— which comprises reacting a strong base, and wherein X is halogen, R¹ is phenyl or substituted phenyl, R³ is hydrogen, alkyl, or phenyl, R⁴ is alkyl, phenyl, or substituted phenyl, and Y is hydrogen, alkyl, phenyl, alkyl-substituted phenyl, hydroxy, alkoxy, alkylthio, said R⁵ being hydrogen, alkyl of 1 to 8 carbons, phenyl or naphthyl, cyano, nitro, amino, alkyl- and dialkyl amino, said alkyl having 1 to 8 carbons, halogen, or trifluoromethyl; the substituents for phenyl in R¹ and R⁴ being alkyl, hydroxy, alkoxy, alkylthio, cyano, nitro, amino, halogen, or trifluoromethyl, said alkyl being from 1 to 8 carbon atoms.

8. The process of claim 7 wherein said compound (I) is thereafter reacted with an organic acid anhydride of the formula R²OR² in the presence of an acid catalyst to provide a compound of the formula wherein R² is acyl.

9. The process of claim 7 wherein the strong base is sodium hydride.

10. The process of claim 8 wherein the acid catalyst is sulfuric acid.

References Cited

UNITED STATES PATENTS 3,331,859   7/1967   Huffman et al. _____ 260—345.2

ALEX MAZEL, Primary Examiner

J. A. NARCAVAGE, Assistant Examiner

U.S. Cl. X.R.

117—33.3; 252—300; 260—41, 345.2